US011402032B1

(12) United States Patent
Zuo et al.

(10) Patent No.: US 11,402,032 B1
(45) Date of Patent: Aug. 2, 2022

(54) ELECTRO-HYDRAULIC PROPORTIONAL VALVE

(71) Applicants: ZHEJIANG UNIVERSITY CITY COLLEGE, Hangzhou (CN); CHINA UNIVERSITY OF MINING AND TECHNOLOGY, Xuzhou (CN)

(72) Inventors: Qiang Zuo, Hangzhou (CN); Haigang Ding, Xuzhou (CN); Zhuhua Deng, Hangzhou (CN); Ziwen Sang, Xuzhou (CN); Qianqian Lu, Hangzhou (CN); Anping Wan, Hangzhou (CN); Wei Shao, Hangzhou (CN); Pengfei Wang, Hangzhou (CN)

(73) Assignees: ZHEJIANG UNIVERSITY CITY COLLEGE, Hangzhou (CN); CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 17/322,936

(22) Filed: May 18, 2021

(30) Foreign Application Priority Data

Apr. 15, 2021 (CN) .......................... 202110404182.9

(51) Int. Cl.
*F16K 31/42* (2006.01)
*F16K 11/07* (2006.01)
*F16K 47/00* (2006.01)

(52) U.S. Cl.
CPC ............ *F16K 31/423* (2013.01); *F16K 11/07* (2013.01); *F16K 47/0112* (2021.08); *Y10T 137/86767* (2015.04)

(58) Field of Classification Search
CPC .... F16K 31/423; F16K 47/0112; F16K 11/06; F16K 11/065; F16K 11/07; F16K 3/24; Y10T 137/86767; Y10T 137/8671; Y10T 137/8667; Y10T 137/86694; Y10T 137/86775; Y10T 137/87217
See application file for complete search history.

(56) References Cited

U.S. PATENT DOCUMENTS

| 3,596,679 | A | * | 8/1971 | Sugden, Jr. | ......... | F15B 13/0402 137/625.68 |
| 4,087,967 | A | * | 5/1978 | Knapp | .................. | F16H 61/433 60/392 |
| 4,664,356 | A | * | 5/1987 | Becker | .................... | F15B 13/04 137/865 |
| 4,672,992 | A | * | 6/1987 | Vanderlaan | ........... | F15B 13/044 251/251 |
| 5,595,218 | A | * | 1/1997 | Hallbach | ................. | F16K 11/07 29/890.128 |

(Continued)

*Primary Examiner* — Mary E McManmon
*Assistant Examiner* — Andrew J Rost (57) ABSTRACT

An electro-hydraulic proportional valve includes: a valve core; a valve sleeve, sleeving an outside of the valve core; a valve body, sleeving an outside of the valve sleeve and fixedly connected to the valve sleeve; a left end cap, covering an end of the valve body, a left sensitive cavity being defined by the left end cap, the valve body, and the valve sleeve; a right end cap, covering the other end of the valve body, a right sensitive cavity being defined by the right end cap, the valve body, and the valve sleeve; a driving mechanism disposed out of the valve body; and a transmission mechanism connected to the driving mechanism and the valve core.

9 Claims, 6 Drawing Sheets

(56) References Cited

U.S. PATENT DOCUMENTS

| | | | | |
|---|---|---|---|---|
| 5,609,352 | A * | 3/1997 | Di Maria | B60G 17/056 |
| | | | | 137/625.69 |
| 5,617,895 | A * | 4/1997 | Pfuhl | F15B 13/044 |
| | | | | 251/282 |
| 7,351,179 | B2 * | 4/2008 | Spickard | H02K 7/06 |
| | | | | 137/330 |
| 7,422,033 | B2 * | 9/2008 | Barber | F15B 13/0402 |
| | | | | 137/625.68 |
| 10,309,542 | B2 * | 6/2019 | Pluciński | F15B 13/0438 |
| 10,364,915 | B2 * | 7/2019 | Murphy | F16K 37/0025 |
| 11,242,041 | B2 * | 2/2022 | Besliu | B60T 8/5043 |
| 2018/0335162 | A1 * | 11/2018 | Brewer | F16K 31/52483 |

\* cited by examiner

ELECTRO-HYDRAULIC PROPORTIONAL VALVE

CROSS-REFERENCE TO RELATED APPLICATIONS

The present application claims the foreign priority of Chinese Patent Application No. 202110404182.9, filed on Apr. 15, 2021, in the China National Intellectual Property Administration, and the entire contents of which are hereby incorporated by reference in its entirety.

TECHNICAL FIELD

The present application relates to the field of fluid transmission and control, and particularly to an electro-hydraulic proportional valve.

BACKGROUND

An electro-hydraulic proportional valve is a hydraulic valve between a switching hydraulic valve and a servo valve. The electro-hydraulic proportional valve may continuously control parameters of hydraulic liquid, such as a pressure and a flow rate of the liquid, based on an input signal, such that the parameters may change proportionally with the input signal. The electro-hydraulic proportional valve may be widely used in a hydraulic system. Compared with the servo valve, the electro-hydraulic proportional valve may be cheaper and may be more resistant to contamination.

In the art, the electro-hydraulic proportional valve may be generally in a type of direct-acting or in a type of pilot-controlled. The direct-acting type of electro-hydraulic proportional valve may work by a proportional electromagnetic directly driving a valve core to move, having a simple structure. However, the electromagnetic may have a limited thrust, a high pressure and a high flow may not be achieved. For the pilot-controlled type of electro-hydraulic proportional valve, a pilot valve may control pressure changes of a pressure chamber at each of two ends of a master valve to generate a relatively large hydraulic pressure to drive a valve core of the master valve to move, such that a high pressure and a high flow may be achieved, but the structure of the valve may be complex.

SUMMARY OF THE DISCLOSURE

The present disclosure may provide an electro-hydraulic proportional valve to achieve the high pressure and the high flow but having a simple structure.

In a first aspect of the present disclosure, an electro-hydraulic proportional valve is provided. The electro-hydraulic proportional valve includes: a valve core, a valve sleeve, a valve body, a driving mechanism, a transmission mechanism. The valve sleeve may be configured to sleeve an outside of the valve core. The valve body may be configured to sleeve an outside of the valve sleeve and fixedly connected to the valve sleeve. The driving mechanism may be disposed out of the valve body. The transmission mechanism may be respectively connected to the driving mechanism and the valve core. The transmission mechanism may be configured to be driven by the driving mechanism to drive the valve core to rotate along a circumferential direction of the valve core relative to the valve sleeve, so as to generate a hydraulic pressure difference. The valve core may be driven by the hydraulic pressure difference to move along an axial direction of the valve core relative to the valve sleeve.

BRIEF DESCRIPTION OF THE DRAWINGS

In order to illustrate technical solutions of embodiments of the present disclosure clearly, accompanying drawings for describing the embodiments will be introduced in brief Obviously, the drawings in the following description are only some embodiments of the present application. For those skilled in the art, other drawings may be obtained based on the provided drawings without any creative work.

DETAILED DESCRIPTION

Technical solutions of embodiments of the present disclosure will be clearly and comprehensively descried by referring to accompanying drawings of the embodiments. Obviously, the described embodiments are only a part of, but not all of, the embodiments of the present disclosure. Based on the embodiments of the present disclosure, all other embodiments obtained by any ordinary skilled person in the art without any creative work may be within the scope of the present disclosure.

The terms "first" and "second" in the present disclosure are used for the purpose of description only, but should not be interpreted as indicating or implying relative significance or implicitly indicate the number of a particular technical feature. The term "a plurality of" in the present disclosure refers to at least two, such as two, three, and so on, unless specified otherwise. In addition, the terms "include", "have", and any variations thereof, are intended to cover non-exclusive inclusion. For example, a process, a method, a system, a product or a device including a series of steps or units are not limited to the listed steps or units, but may also include other unlisted steps or units. Alternatively, other steps or units that are inherently included in the process, in the method, in the product, or in the device may be included.

Figure 1:
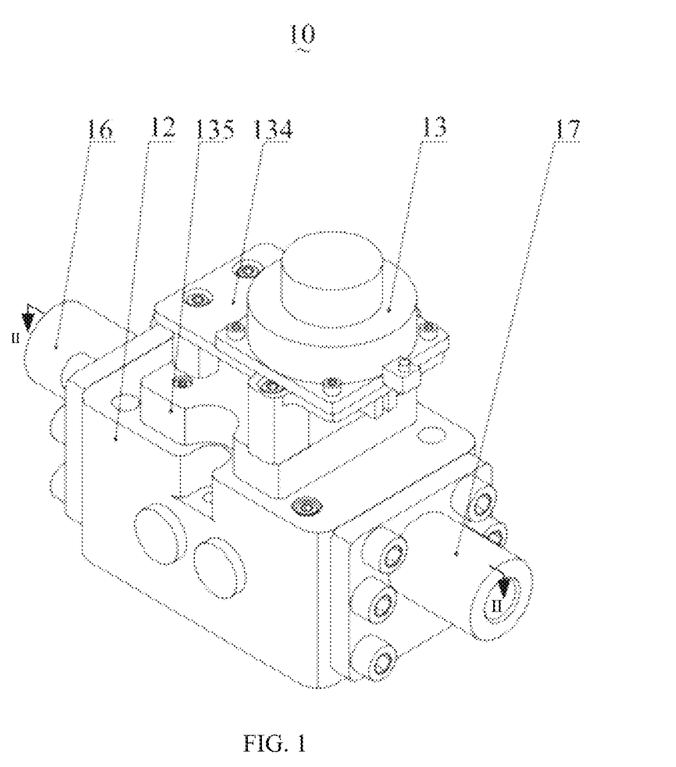
FIG. 1 is a perspective view of an electro-hydraulic proportional valve according to an embodiment of the present disclosure.
Figure 2:
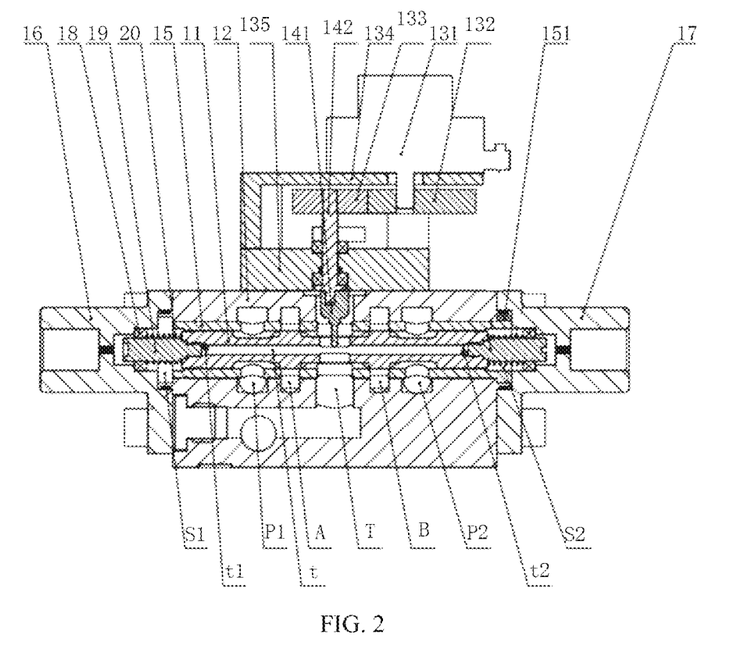
FIG. 2 is a schematic view of a cross section of the electro-hydraulic proportional valve shown in FIG. 1 taken along the line II-II.
Figure 3:
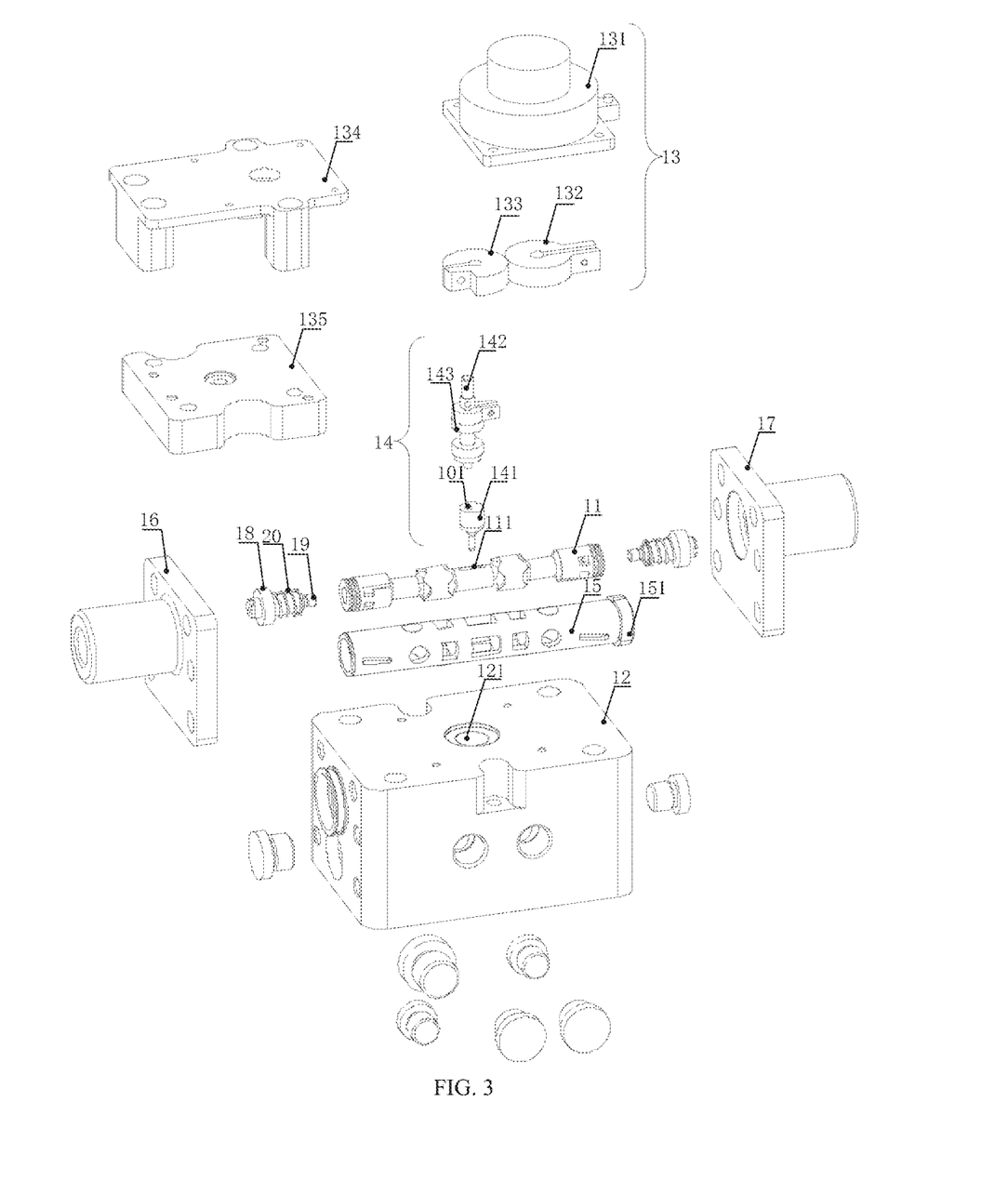
FIG. 3 is an exploded perspective view of the electro-hydraulic proportional valve shown in FIG. 1.
Figure 4:
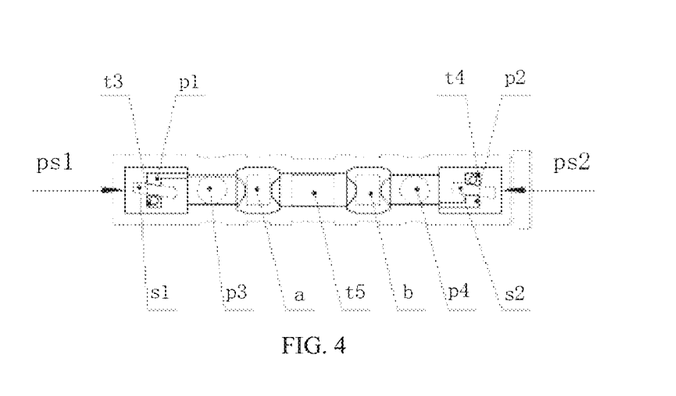
FIG. 4 is a top view of the assembled valve core and valve sleeve in the electro-hydraulic proportional valve shown in FIG. 1.

The present disclosure may provide an electro-hydraulic proportional valve, as shown in FIGS. 1 to 4. FIG. 1 is a perspective view of an electro-hydraulic proportional valve according to an embodiment of the present disclosure. FIG. 2 is a schematic view of a cross section of the electro-hydraulic proportional valve shown in FIG. 1 taken along the line II-II. FIG. 3 is an exploded perspective view of the electro-hydraulic proportional valve shown in FIG. 1. FIG. 4 is a top view of the assembled valve core and valve sleeve in the electro-hydraulic proportional valve shown in FIG. 1. The electro-hydraulic proportional valve 10 of the present embodiments may include: a valve core 11, a valve body 12, a valve sleeve 15, a left end cap 16, a right end cap 17, a driving mechanism 13, and a transmission mechanism 14. The valve sleeve 15 may sleeve an outside of the valve core 11. The valve body 12 may sleeve an outside of the valve sleeve 15 and may be fixedly connected to the valve sleeve 15. The left end cap 16 may be disposed on and cover an end of the valve body 12. A left sensitive cavity may be defined cooperatively by the left end cap 16, the valve body 12 and valve sleeve 15. The right end cap 17 may be disposed on and cover the other end of the valve body 12. A right sensitive cavity may be defined cooperatively by the right end cap 17, the valve body 12 and valve sleeve 15. The driving mechanism 13 may be disposed out of the valve body 12. The transmission mechanism 14 may be respectively connected to driving mechanism 13 and the valve core 11. The transmission mechanism 14 may be configured to be driven by the driving mechanism 13 to drive the valve core 11 to rotate along a circumferential direction of the valve core 11 with respect to the valve sleeve 15. In this way, a hydraulic pressure difference may be generated between the left sensitive cavity and the right sensitive cavity. The valve core 11 may be driven by the hydraulic pressure difference to move along the axial direction of the valve core 11 with respect to the valve sleeve 15.

In the present embodiment, the transmission mechanism 14 may transmit a driving force generated by the driving mechanism 13 to the valve core 11, and may enable the valve core 11 to rotate along the circumferential direction of the valve core 11 with respect to the valve sleeve 15 (the valve body 12), such that a valve port of the electro-hydraulic proportional valve 10 may be open. As the valve core 11 rotates along the circumferential direction of the valve core 11, a hydraulic pressure difference may be generated between the left sensitive cavity and the right sensitive cavity, and a hydraulic pressure difference is generated between both ends of the valve core 11. The valve core 11 may be driven by the hydraulic pressure difference to move along the axial direction of the valve core 11 to enable the valve core 11 to reach a balanced position.

According to the present disclosure, the electro-hydraulic proportional valve 10 may transmit the driving force of the driving mechanism 13 to the valve core 11 through the transmission mechanism 14 to enable the valve core 11 to rotate along the circumferential direction. In this way, the insufficient thrust due to the traditional proportional electromagnetic directly driving the valve core may be solved. Therefore, the high pressure and the high flow may be achieved by the present disclosure. In the present disclosure, a one-stage valve core may be configured. The valve core may move along the axial direction of the valve core by the hydraulic pressure difference between the two ends of the valve core. It may be equivalent to the pilot-controlled type of electro-hydraulic proportional valve configured with a two-stage valve core. The electro-hydraulic proportional valve in the present disclosure may have a simple structure.

In the present embodiment, flow communication or hydraulic pressure communication between the valve body 12 and the valve core 11 may be achieved through the valve sleeve 15, and a pressure of the left sensitive cavity may be equal to a pressure of the right sensitive cavity.

A left end of the valve sleeve 15 may be pressed tightly by the left end cap 16 and may be fixedly connected to the left end cap 16 by a screw. A right end of the valve sleeve 15 may be pressed tightly by the right end cap 17 and may be fixedly connected to the right end cap 17 by a screw.

In the art, a hydraulic half-bridge principle may be applied to a sensitive cavity of a two-dimensional electro-hydraulic proportional valve. A pressure of the sensitive cavity at one end of the valve core may be changed by rotating the valve core. A balanced state between the sensitive cavity and a high-pressure cavity at the other end of the valve core may be achieved through a spiral groove. A pilot stage and the proportional electromagnetic may be eliminated. Although a volume and a mass of the two-dimensional electro-hydraulic proportional valve may be reduced, being able to easily achieve the high pressure and the high flow, the sensitive cavity on one side of the valve core may be affected by a back pressure of a low-pressure port, resulting in pressure changes in the sensitive cavity, affecting a zero position of the valve core. According to the electro-hydraulic proportional valve 10 in the present embodiment, the pressure difference between double-side sensitive cavities may generate the hydraulic driving force on the valve core 11 twice as much as the hydraulic driving force generated by the single-side sensitive cavity, such that a response speed may be improved. Pressure states of the two sensitive cavities may be the same. The pressure difference generated by the valve core 11 rotating may change with the high pressure port of the system, the back pressure of the return port and other factors. However, movement displacement of the valve core 11 may not change, and the zero position of the valve core 11 may not change.

Alternatively, in the present embodiment, a middle portion of the valve body 12 may define a through-hole 121. A middle portion of the valve core 11 may define a slot 111. The driving mechanism 13 may be configured on a side of the valve body 12 along a radial direction of the valve core 11. The driving mechanism 14 may include a lever 141. An end of the lever 141 may be fixedly connected to the driving mechanism 13. The other end of the lever 141 may be received in and pass through the through hole 121 and may be received in the slot 111. The lever 141 may be configured to be driven by the driving mechanism 13 to drive the valve core 11 to rotate along the circumferential direction of the valve core 11 relative to the valve body 12.

In the present embodiment, the driving mechanism 13 and the valve core 11 may be disposed to form a T-shaped layout to avoid a size of the electro-hydraulic proportional valve 10 along the axial direction of the valve core 11 being excessively large. Further, the T-shaped layout may allow the driving mechanism 13 to easily drive the valve core 10 vertically, such that a speed may be reduced, and the torque may be increased. In other embodiments, the driving mechanism 13 and the valve core 11 may be disposed linearly, which will not be limited by the present disclosure.

Alternatively, in the present embodiment, the transmission mechanism 14 may further include a transmission rod 142. An end of the transmission rod 142 may be connected to an end of the lever 141 away from the valve core 11. The other end of the transmission rod 142 may be connected to the driving mechanism 13. The lever 141 and the transmission rod 142 may be disposed eccentrically. The transmission rod 142 may be driven by the driving mechanism 13 to rotate. The transmission rod 142 may drive the lever 141 to rotate around the transmission rod 142. In the present embodiment, the transmission rod 142 and the lever 141 may be eccentrically disposed to allow the driving mechanism 13 to drive the valve core 11 vertically. Compared to a reducer in the art, the eccentric configuration of the present embodiment may have a simpler structure. Of course, in other embodiments, a non-eccentric mechanism may also be configured to allow the driving mechanism to drive the valve core vertically.

According to the above description, when the driving mechanism 13 drives the transmission rod 142 to rotate, the lever 141 may take the transmission rod 142 as a center and rotate around the transmission rod 142. That is, the lever 141 may perform a circular motion on a plane perpendicular to an extending direction of the lever 141, and that is, the lever 141 may have displacement along two vertical directions on the plane. In order to allow the lever 141 to drive the valve core 11 to rotate along the circumferential direction without moving along an axial direction of the lever 141, a size of the slot 111 of the valve core 11 along the axial direction of the valve core 11 may be greater than the a size of the slot 111 along a direction perpendicular to the axial direction of the valve core 11 and a direction perpendicular to an axial direction of the transmission rod 142. In this way, when the lever 141 rotates, a lower end of the lever 141, the end of the lever 141 connected to the valve core 11, may abut against a side wall of the slot 111 along the direction perpendicular to the axial direction of the valve core 11 and the axial direction of the transmission rod 142.

Alternatively, in the present embodiment, an end surface of the end of the lever 141 away from the valve core 11 may define a hole 101. An end of the transmission rod 142 close to the lever 141 may be received in the hole 101. A central axis of the hole 101 and a central axis of the lever 141 may be spaced apart from each other along the radial direction of the lever 141.

In the present embodiment, the transmission rod 142 and the lever 141 are not configured as an integral and overall element, such that the transmission rod 142 and the lever 141 may be easily disassembled and replaced. The transmission rod 142 and/or lever 141 may be selectively replaced according to different driving mechanisms 13 and/or different valve cores 11, saving costs.

In other embodiments, the transmission rod and the lever may be configured as an integral and overall element, which may improve stability of the transmission mechanism.

Alternatively, in the present embodiment, the transmission mechanism 14 may further include a bearing 143. An outer ring of the bearing 143 may be fixedly connected to the driving mechanism 13, and an inner ring of the bearing 143 may sleeve the outside of the transmission rod 142.

In the present embodiment, by providing the bearing 143, stability of the transmission rod 142 when rotating may be improved, and the driving force applied on the transmission rod 142 may be increased.

In the present embodiment, in order to further improve the stability of the transmission rod 142 while rotating, two bearings 143 may sleeve the outside of the transmission rod 142 and may be spaced apart from each other. In other embodiments, the number of bearings may not be limited.

Alternatively, the driving mechanism 13 may include a motor 131, an active-driving wheel 132 and a driven wheel 133. The active-driving wheel 132 may be fixedly connected to a rotation shaft of the motor 131. The driven wheel 133 may be connected to the active-driving wheel 132 by transmission and fixedly connected to the transmission rod 142.

The motor 131 may drive the active-driving wheel 132 to rotate in the plane perpendicular to the axial direction of the transmission rod 142 through the rotating shaft of the motor 131. The active-driving wheel 132 may drive the driven wheel 133 to rotate in the plane, and the driven wheel 133 may drive the transmission rod 142 to be automatically move in the plane.

In the present embodiment, the transmission rod 142 and the driven wheel 133 may be coaxially configured, such that the transmission rod 142 may be automatically move in the plane. In other embodiments, the transmission rod 142 and the driven wheel 133 may be eccentrically configured.

In other embodiments, the motor may directly drive the transmission rod to rotate. Alternatively, the motor may directly drive the lever or drive lever through a transmission member to move along the direction perpendicular to the axial direction of the valve core and the axial direction of the transmission rod, such that the valve core may be driven to rotate along the circumferential direction of the valve core relative to the valve body.

In the present embodiment, gears may be configured, serving as the active-driving wheel 132 and the driven wheel 133, and the active-driving wheel 132 and the driven wheel 133 may be meshed. In other embodiments, a pulley and a transmission belt, and so on, may be configured to replace the gears.

Alternatively, in the present embodiment, the electro-hydraulic proportional valve 10 may further include a fixation seat 134 and a fixation plate 135. The motor 131 may be fixed on the fixation seat 134, the fixation seat 134 may be fixed on the fixation plate 135. The fixation plate 135 may be fixed on the valve body 12. The fixation seat 134 may define a through hole. The outer ring of the bearing 143 may be fixedly connected to a side wall of the through hole of the fixation seat 134.

Alternatively, in the present embodiment, a transmission ratio of the active-driving wheel 132 to the driven wheel 133 may be less than 1, such that a torque amplifying mechanism may be formed by the active-driving wheel 132 and the driven wheel 133, increasing the driving force. In other embodiments, different ratios may be achieved by configuring different radii and numbers of active-driving wheels and/or different radii and numbers of driven wheels.

Alternatively, a ring-shaped protrusion 151 may be disposed on the outside of the valve sleeve 15. A ring-shaped recess (not shown in the figure) may be defined in the valve body 12. The ring-shaped protrusion 151 may be received in the ring-shaped recess, such that the valve sleeve 15 may be fixedly connected to the valve body 12, and such a positioning structure may facilitate disassembling and assembling.

In other embodiments, other structures, such as a positioning pin, a buckle, and so on, may be configured to achieve the fixed connection between the valve sleeve 15 and the valve body 12.

Alternatively, in the present embodiment, the valve body 12 defines a left high pressure port P1, a left working port A, a return port T, a right working port B, and a right high pressure port P2 successively along the axial direction of the valve core 11. The pressures of the left high pressure port P1 and the right high pressure port P2 may be equal. The valve sleeve 15 may define a left sensitive groove s1, a left high pressure hole p3, a left working groove a, a low pressure groove t5, a right working groove b, a right high pressure hole p4, a right sensitive groove s2 successively along the axial direction of the valve core 11. The left sensitive groove s1 may be communicated with the left sensitive cavity S1. The left high pressure hole p3 may be communicated with the left high pressure port P1. The left working groove a may be communicated with the left working port A. The low pressure groove t5 may be communicated with the return port T. The right working groove b may be communicated with the right working port B. The right high pressure hole p4 may be communicated with the right high pressure port P2. The right sensitive groove s2 may be communicated with the right sensitive cavity S2. The valve core 11 may define a low pressure flow channel t extending along the axial direction of the valve core 11. The low pressure flow channel t may be communicated with the return port T through the low pressure groove t5. An end of the valve core 11 may define a left sensitive high pressure slot p1 and a left sensitive low pressure slot t3. The other end of the valve core 11 may define a right sensitive high pressure slot p2 and a right sensitive low pressure slot t4. The left sensitive high pressure slot p1 may be communicated with the left high pressure port P1. The left sensitive low pressure slot t3 may be communicated with the low pressure flow channel t through a left low pressure hole t1. The right sensitive high pressure slot p2 may be communicated with the right high pressure port P2. The right sensitive low pressure slot t4 may be communicated with the low pressure flow channel t through a right low pressure hole t2.

The low pressure flow channel t may be defined along the central axis of the valve core 11, i.e., a central axis of the low pressure flow channel t may coincide with the central axis of the valve core 11. The left sensitive high pressure slot p1 and the left sensitive low pressure slot t3 are centro-symmetrically defined. The right sensitive high pressure slot p2 and the right sensitive low pressure slot t4 may be centro-symmetrically defined.

Alternatively, in the present embodiment, the electro-hydraulic proportional valve 10 may further include: a left bearing 18, a left spring seat 19, a left resetting spring 20, a right bearing, a right spring seat, and a right resetting spring. The left bearing 18 may be disposed inside the left end cap 16, and an outer ring of the left bearing 18 may be fixedly connected to the left end cap 16. An end of the left spring seat 19 may be fixedly connected to an end of the valve core 11, and the other end of the left spring seat 19 may be disposed inside the inner ring of the left bearing 18. The left resetting spring 20 may sleeve an outside of the left spring seat 19. An end of the left resetting spring 20 may abut against the left bearing 18, and the other end of the left resetting spring 20 may abut against the valve core 11. The right bearing may be disposed inside the right end cap 17. An outer ring of the right bearing may be fixedly connected to the right end cap 17. An end of the right spring seat may be fixedly connected to the other end of the valve core 11, and the other end of the right spring seat may be disposed inside the inner ring of the right bearing. The right resetting spring may sleeve the outside of the right spring seat. An end of the right resetting spring may against the right bearing, and the other end of the right resetting spring may abut against the valve core 11.

Stiffness of the left resetting spring 20 and the right resetting spring may be equal, and the left resetting spring 20 and the right resetting spring may be configured in an equal compression state having equal compression amount.

Alternatively, the valve core 11 may threaded to the left spring seat 19 and the right spring seat. The threaded connection may be applied to seal the low pressure flow channel t defined in the valve core 11, the left sensitive cavity S1, and the right sensitive cavity S2. Transition engagement may be applied to a position of the threaded connection. The valve core 11, the left spring seat 19 and the right spring seat may be coaxially configured. The left resetting spring 20 and the right resetting spring may be configured to enable the valve core 11 to be in a neutral position when the valve core 11 is in a static state, and to reduce rotational friction while the valve core 11 is rotating in a moving state.

The valve core 11 may rotate to enable the left sensitive cavity S1 to alternately communicate with the left sensitive high pressure slot p1 of the valve core 11 and the left sensitive low pressure slot t3 of valve core 11. At the same time, the valve core 11 may rotate to enable the right sensitive cavity S2 to alternately communicate with the right sensitive low pressure slot p2 of the valve core 11 and the right sensitive high pressure slot t4 of the valve core 11. Areas of two end surfaces of the valve core 11 may be equal. The valve core 11 may be driven by the hydraulic pressure difference between the left sensitive cavity S1 and the right sensitive cavity S2 to slide along the axial direction to reach a new balance position to achieve corresponding function.

When the motor 131 is not working, the lever 141 may be in a middle state, the valve core 11 may be in the neutral position, each shoulder of the valve core 11 may seal each hole, each groove, and each slot of the valve sleeve 15, and the valve port may not be open. An overlapped area between the left sensitive slot s1 of the valve sleeve 15 and the left sensitive low pressure slot t3 may be equal to an overlapped area between the left sensitive slot s1 of the valve sleeve 15 and the left sensitive high pressure slot p1 of the valve core 11. The left sensitive slot s1 of the valve sleeve 15 may be at a neutral position of the left sensitive low pressure slot t3 and the left sensitive high pressure slot p1 of the valve core 11. An overlapped area between the right sensitive slot s2 of the valve sleeve 15 and the right sensitive low pressure slot t4 may be equal to an overlapped area between the right sensitive slot s2 of the valve sleeve 15 and the right sensitive high pressure slot p2 of the valve core 11. The right sensitive slot s2 may be at a neutral position of the right sensitive low pressure slot t4 and the right sensitive high pressure slot p2 of the valve core 11. The left sensitive low pressure slot t3 may be communicated with the return port T through the left low pressure hole t1 and the central low pressure flow channel t. The right sensitive low pressure slot t4 may be communicated with the return port T through the right low pressure hole t2 and the central low pressure flow channel t. The left sensitive high pressure slot p1 may be communicated with the left high pressure port P1, and the right sensitive high pressure slot p2 may be communicated with the right high pressure port P2.

According to a hydraulic-damping half-bridge principle, a relationship between pressures of the left sensitive cavity S1 and the right sensitive cavity S2 may satisfy the following equations.

$$ps1 = \frac{P1 + T}{2}$$

$$ps2 = \frac{P2 + T}{2}$$

In the equations, the pressures at the left high pressure port P1 and right high pressure port P2 may be equal. Therefore, ps1=ps2.

The valve core 11 has same stiffness and same compression on the left resetting spring 20 and right resetting spring. Therefore, elastic forces generated by the left and the right resetting springs may be equal and in opposite directions.

When the motor 13 is conducted and rotating, the rotation shaft of the motor 13 rotating anti-clockwise may be taken as the motor 13 rotating positively when the motor 13 is viewed from the above downwardly, and the valve core 11 rotating anti-clockwise may be taken as the valve core rotating positively when the valve core 11 is viewed from left to right. The motor 13 may rotate positively for a certain angle, to successively drive the active-driving wheel 132, the driven wheel 133, the transmission rod 142, and the lever 141. As the lever 141 and the transmission rod 142 are eccentrically configured, the lever 141 may drive the valve core 11 to rotate positively. At this time, the overlapped area between the left sensitive slot s1 of valve sleeve 15 and the left sensitive low pressure slot t3 of valve core 11 may be increased, and the overlapped area between the left sensitive slot s1 of valve sleeve 15 and the left sensitive high pressure slot p1 may be reduced. That is, the left sensitive cavity S1 may communicate with the outlet port T, and the pressure ps1 of the left sensitive cavity S1 may be reduced. At the same time, the overlapped area between the right sensitive slot s2 of the valve sleeve 15 and the right sensitive high pressure slot p2 of the valve core 11 may be increased, and the overlapped area between the right sensitive slot s2 of the valve sleeve 15 and the right sensitive low pressure slot t4 may be reduced. That is, the right sensitive cavity S2 may communicate with the right high pressure port P2, and the pressure ps2 of the right sensitive cavity S2 may be increased.

At this time, a pressure at the left end surface of the valve core 11 may be less than that at the right end surface of the valve core 11. The valve core 11 may be driven by the hydraulic pressure difference along the axial direction to slide to the left along the axial direction of valve core 11. The overlapped area between the left sensitive slot s1 of the valve sleeve 15 and the left sensitive low pressure slot t3 of the valve core 11 may gradually decrease, and the overlapped area between the left sensitive slot s1 of the valve sleeve 15 and the left sensitive high pressure slot p1 may gradually increase, until the overlapped area between the left sensitive slot s1 of the valve sleeve 15 and the left sensitive low pressure slot t3 is equal to the overlapped area between the left sensitive slot s1 of the valve sleeve 15 and the left sensitive high pressure slot p1 again. At the same time, the overlapped area between the right sensitive slot s2 of the valve sleeve 15 and the right sensitive high pressure slot p2 of the valve core 11 may gradually decrease, and the overlapped area between the right sensitive slot s2 of the valve sleeve 15 and the right sensitive low pressure slot t4 may gradually increase, until the overlapped area between the right sensitive slot s2 of the valve sleeve 15 and the right sensitive high pressure slot p2 is equal to the overlapped area between the right sensitive slot s2 of the valve sleeve 15 and the right sensitive low pressure slot t4 again. At this time, the pressure ps1 of the left sensitive cavity S1 and the pressure ps2 of the right sensitive cavity S2 may be equal again, and the valve core 11 may be in a balanced position along the axial direction.

While the valve core 11 is moving to the left along the axial direction, the valve port may gradually open, the left working port A may communicate with the return port T through the left working groove a and the low pressure groove t5 of the valve sleeve 15, and the right high pressure port P2 may be communicated with the right working port B through the right working groove b and right high pressure hole p4 of the valve sleeve 15, until the valve core 11 is in the balanced state along the axial direction again.

On the other hand, the motor 131 may rotate reversely for a certain angle, and a working principle may be similar to that when the motor 131 rotates positively. The high pressure and the low pressure at both ends of valve core 11 may be switched, and the valve core 11 may slide to the right along the axial direction, until the valve core 11 reaches a new balanced position, the valve port may open towards an opposite direction or close.

Each of the left sensitive slot s1 and right sensitive slot s2 of valve sleeve 15 may be an inclined slot. A rotation angle of motor 131 may be reflected in the inclined slot of valve sleeve 15. The inclined slot may be linearly correlated with the axial movement of valve core 11. Therefore, the rotation angle of the motor 131 may be linearly correlated with the axial sliding of valve core 11. Therefore, the valve core 11 may continuously linearly output by continuously controlling the input signal of the motor 131, such that electro-hydraulic proportional valve may perform a valve-reversing function.

In the present embodiment, the electro-hydraulic proportional valve 10 may be a three-position four-way directional electro-hydraulic proportional valve.

Figure 5:
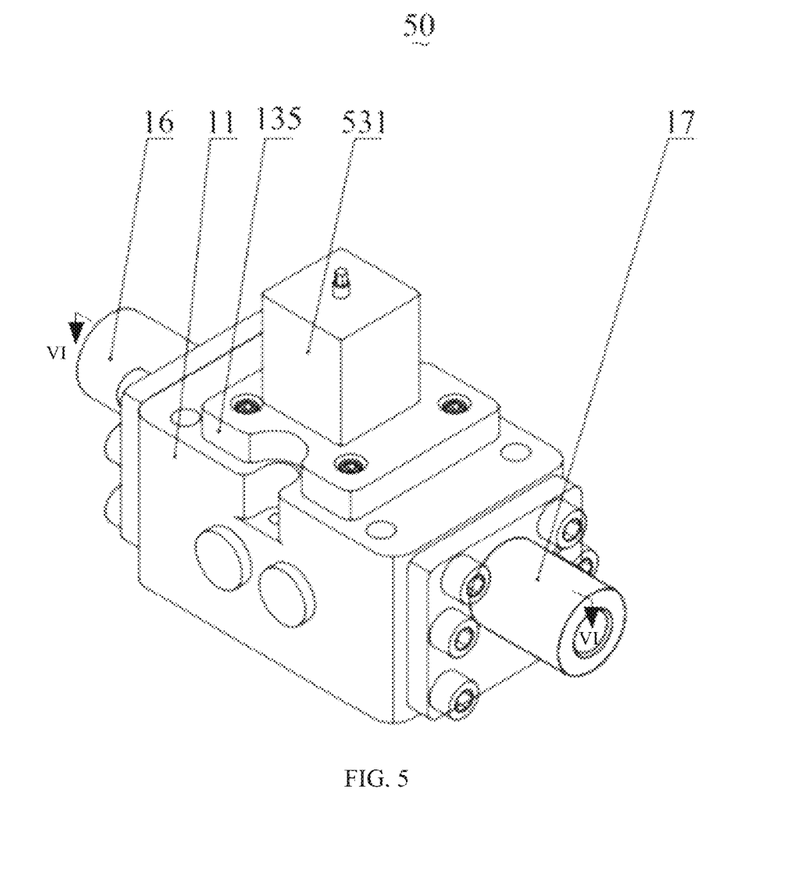
FIG. 5 is a perspective view of an electro-hydraulic proportional valve according to another embodiment of the present disclosure.
Figure 6:
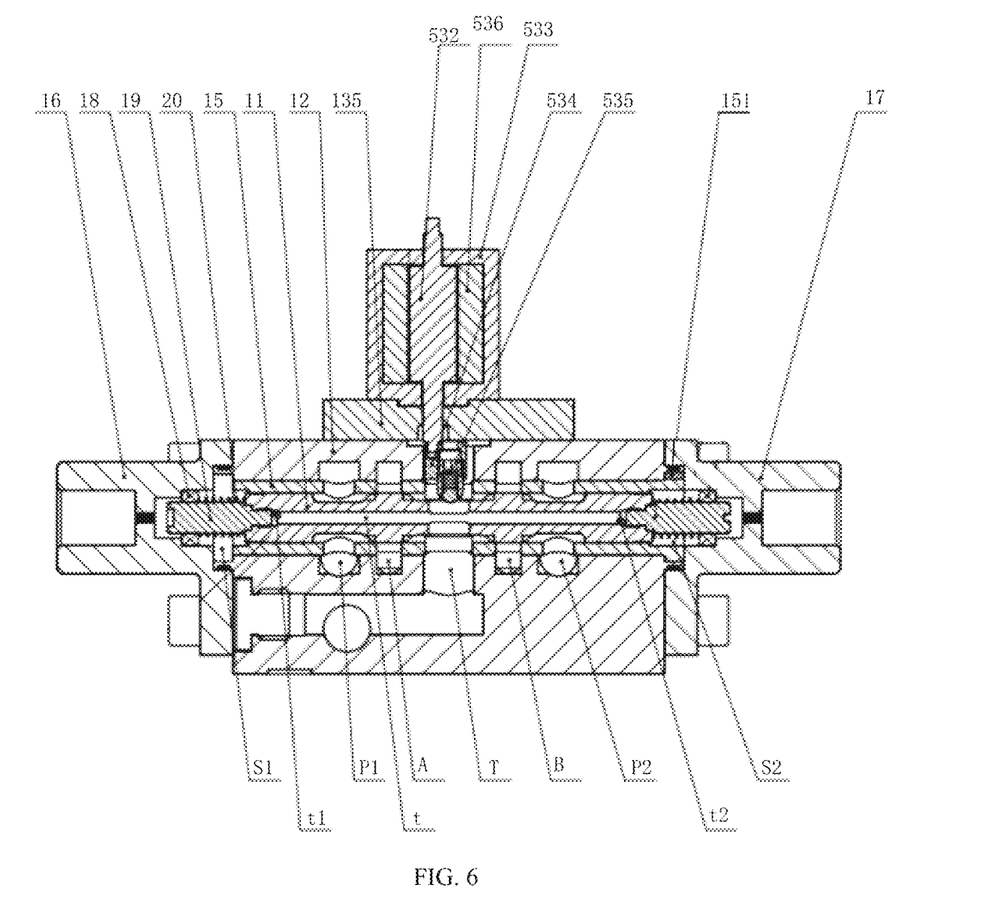
FIG. 6 is a schematic view of a cross section of the electro-hydraulic proportional valve shown in FIG. 5 taken along the line VI-VI.
Figure 7:
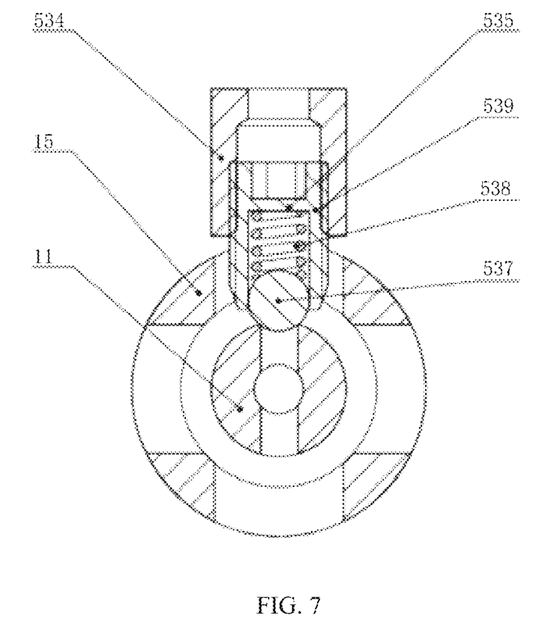
FIG. 7 is a schematic view of a bead screw of the electro-hydraulic proportional valve shown in FIG. 5, taken along an axial direction.

The present disclosure may provide an electro-hydraulic proportional valve according to another embodiment, as shown in FIGS. 5 to 7. FIG. 5 is a perspective view of an electro-hydraulic proportional valve according to another embodiment of the present disclosure. FIG. 6 is a schematic view of a cross section of the electro-hydraulic proportional valve shown in FIG. 5 taken along the line VI-VI. FIG. 7 is a schematic view of a bead screw of the electro-hydraulic proportional valve shown in FIG. 5, taken along an axial direction. In the present embodiment, the electro-hydraulic proportional valve 50 may differ from the above electro-hydraulic proportional valve shown in that: 1) the rotation shaft 532 of the motor 531, i.e., the rotor extending to a shell 533, enables initial zero adjustment when the power is off, and precise adjustment may be achieved by controlling the rotation angle of the motor 531 when the power is on; 2) the lever 532 in the present embodiment may include a body portion and a bead screw 535. The body portion may be fixedly connected to the rotation shaft 532 of the motor 531. The bead screw 535 may be fixedly and threadly connected to the body portion. A bead 537 disposed inside the bead screw 535 may press a slot (not shown in the figure) of the valve core 11 by pretension of a compression spring 538 disposed inside the bead screw 535.

The bead 537 disposed inside the bead screw 535 may contact the slot of the valve core 11 at all times by the pretension of the compression spring 538. In this way, it may be ensured that the lever 534 continually contacts the valve core 11, a zero-position gap may be eliminated, a dead space may be reduced, such that characteristics of continuous and proportional adjustment may be achieved.

The motor 531 may further be configured with a stator 536. A lower end of the rotation shaft 532 is threaded and fixedly connected to the lever 534. The bead screw 535 is further configured with a threaded housing 539, and the compression spring 538 may be disposed inside the threaded housing 539. Other structures of the electro-hydraulic proportional valve 50 in the present embodiment may be referred to the electro-hydraulic proportional valve 10 shown in the above.

According to the present disclosure, the electro-hydraulic proportional valve may include: a valve core, a valve sleeve, a valve body, a left end cap, a right end cap, a driving mechanism, a transmission mechanism. The valve sleeve may be configured to sleeve an outside of the valve core. The valve body may be configured to sleeve an outside of the valve sleeve and fixedly connected to the valve sleeve. The left end cap may be disposed on and cover an end of the valve body. A left sensitive cavity may be defined cooperatively by the left end cap, the valve body, and the valve sleeve. The right end cap may be disposed on and cover the other end of the valve body. A right sensitive cavity may be defined cooperatively by the right end cap, the valve body, and the valve sleeve. The driving mechanism may be disposed out of the valve body. The transmission mechanism may be respectively connected to the driving mechanism and the valve core. The transmission mechanism may be configured to be driven by the driving mechanism to drive the valve core to rotate along a circumferential direction of the valve core relative to the valve sleeve, so as to generate a hydraulic pressure difference between the left sensitive cavity and the right sensitive cavity. The valve core may be driven by the hydraulic pressure difference to move along an axial direction of the valve core relative to the valve sleeve. According to the present disclosure, the electro-hydraulic proportional valve may transmit a driving force of the driving mechanism to the valve core through the transmission mechanism to allow the valve core to rotate along the circumferential direction. In this way, the insufficient thrust in the art due to the proportional electromagnetic directly driving the valve core may be solved. Therefore, the high pressure and the high rate may be achieved by the present disclosure. In the present disclosure, a one-stage valve core may be configured. The valve core may move along the axial direction of the valve core by the hydraulic pressure difference between the two ends of the valve core. It may be equivalent to the pilot-controlled type of electro-hydraulic proportional valve configured with a two-stage valve core. The electro-hydraulic proportional valve in the present disclosure may have a simple structure, and therefore, the structure of the electro-hydraulic proportional valve may be simplified.

The above description provides only an implementation of the present disclosure, but does not limit the scope of the present disclosure. Any equivalent structure or equivalent process transformation performed based on the specification of the present disclosure and the accompanying drawings, being applied directly or indirectly in other related technical fields, should be included in the scope of the present disclosure.

What is claimed is:

1. An electro-hydraulic proportional valve, comprising:
a valve core;
a valve sleeve, configured to sleeve an outside of the valve core;
a valve body, configured to sleeve an outside of the valve sleeve and fixedly connected to the valve sleeve;
a left end cap, configured to cover an end of the valve body, wherein a left sensitive cavity is defined by the left end cap, the valve body, and the valve sleeve;
a right end cap, configured to cover another end of the valve body, wherein a right sensitive cavity is defined by the right end cap, the valve body, and the valve sleeve;
a driving mechanism, disposed at an outside of the valve body; and
a transmission mechanism, connected to the driving mechanism and the valve core, wherein the transmission mechanism is configured to be driven by the driving mechanism to drive the valve core to rotate along a circumferential direction of the valve sleeve with respect to the valve sleeve, enabling a hydraulic pressure difference to be generated between the left sensitive cavity and the right sensitive cavity, and the valve core is configured to be driven by the hydraulic pressure difference to move along an axial direction of the valve core with respect to the valve sleeve;
wherein a middle portion of the valve body defines a through hole, a middle portion of the valve core defines a slot;
the driving mechanism is disposed on a side of the valve body along a radial direction of the valve core;
the transmission mechanism comprises a transmission rod and a lever, an end of the transmission rod is connected to an end of the lever, another end of the transmission rod is connected to the driving mechanism, and another end of the lever is received in and passes through the through hole and is received in the slot;
the lever and the transmission rod are eccentrically configured;
the transmission rod is configured to be driven by the driving mechanism to rotate;
the transmission rod is configured to drive the lever to rotate around the transmission rod;
the lever is configured to drive the valve core to rotate along the circumferential direction of the valve core with respect to the valve body;
a size of the slot along the axial direction of the valve core is greater than a size of the slot along a direction perpendicular to the axial direction of the valve core and an axial direction of the transmission rod.

2. The electro-hydraulic proportional valve according to claim 1, wherein an end surface of an end of the lever away from the valve core defines a hole, an end of the transmission rod close to the lever is received in the hole, and a central axis of the hole and a central axis of the lever are spaced apart from each other along a radial direction of the lever.

3. The electro-hydraulic proportional valve according to claim 1, wherein the transmission mechanism further comprises a bearing, an outer ring of the bearing is fixedly connected to the driving mechanism, and an inner ring of the bearing is configured to sleeve an outside of the transmission rod.

4. The electro-hydraulic proportional valve according to claim 1, wherein the driving mechanism comprises:
a motor;
an active-driving wheel, fixedly connected to a rotation shaft of the motor; and
a driven wheel, connected to the active-driving wheel by transmission and fixedly connected to the transmission rod.

5. The electro-hydraulic proportional valve according to claim 4, wherein a transmission ratio of the active-driving wheel to the driven wheel is less than 1.

6. The electro-hydraulic proportional valve according to claim 4, wherein the lever comprises:
a body portion, fixedly connected to the rotation shaft of the motor;
a bead screw, fixedly and threadly connected to the body portion, wherein a bead disposed inside the bead screw is tightly pressed by pretension of a compression spring, which is disposed inside the bead screw, to be received in the slot of the valve core.

7. The electro-hydraulic proportional valve according to claim 4, wherein the rotation shaft is extended to reach an outside of a shell of the motor.

8. The electro-hydraulic proportional valve according to claim 1, wherein
the valve body defines a left high pressure port, a left working port, a return port, a right working port, a right high pressure port successively along the axial direction of the valve core, a pressure at the left high pressure port is equal to a pressure at the right high pressure port;

the valve sleeve defines a left sensitive groove, a left high pressure hole, a left working groove, a low pressure groove, a right working groove, a right high pressure hole, and a right sensitive groove successively along the axial direction of the valve core;

the left sensitive groove is communicated with the left sensitive cavity, the left high pressure hole is communicated with the left high pressure port, the left working groove is communicated with the left working port, the low pressure groove is communicated with the return port, the right working groove is communicated with the right working port, the right high pressure hole is communicated with the right high pressure port, the right sensitive groove is communicated with the right sensitive cavity;

the valve core defines a low pressure flow channel along the axial direction of the valve core, the low pressure flow channel is communicated with the return port through the low pressure groove, an end of the valve core defines a left sensitive high pressure slot and a left sensitive low pressure slot, and another end of the valve core defines a right sensitive high pressure slot and a right sensitive low pressure slot; and the left sensitive high pressure slot is communicated with the left high pressure port, the left sensitive low pressure slot is communicated with the low pressure flow channel through the left low pressure hole, the right sensitive high pressure slot is communicated with the right high pressure port, and the right sensitive low pressure slot is communicated with the low pressure flow channel through the right low pressure hole.

9. The electro-hydraulic proportional valve according to claim 1, further comprising:
 a left bearing, disposed inside the left end cap, wherein an outer ring of the left bearing is fixedly connected to the left end cap;
 a left spring seat, wherein an end of the left spring seat is fixedly connected to the end of the valve core, and another end of the left spring seat is sleeved by an inner ring of the left bearing;
 a left resetting spring, configured to sleeve an outside of the left spring seat, wherein an end of the left resetting spring abuts against the left bearing, and another end of the left resetting spring abuts against the valve core;
 a right bearing, disposed inside the right end cap, wherein an outer ring of the right bearing is fixedly connected to the right end cap;
 a right spring seat, wherein an end of the right spring seat is fixedly connected to the end of the valve core, and another end of the right spring seat is sleeved by an inner ring of the right bearing;
 a right resetting spring, configured to sleeve an outside of the right spring seat, wherein an end of the right resetting spring abuts against the right bearing, and another end of the right resetting spring abuts against the valve core.

* * * * *